UNITED STATES PATENT OFFICE.

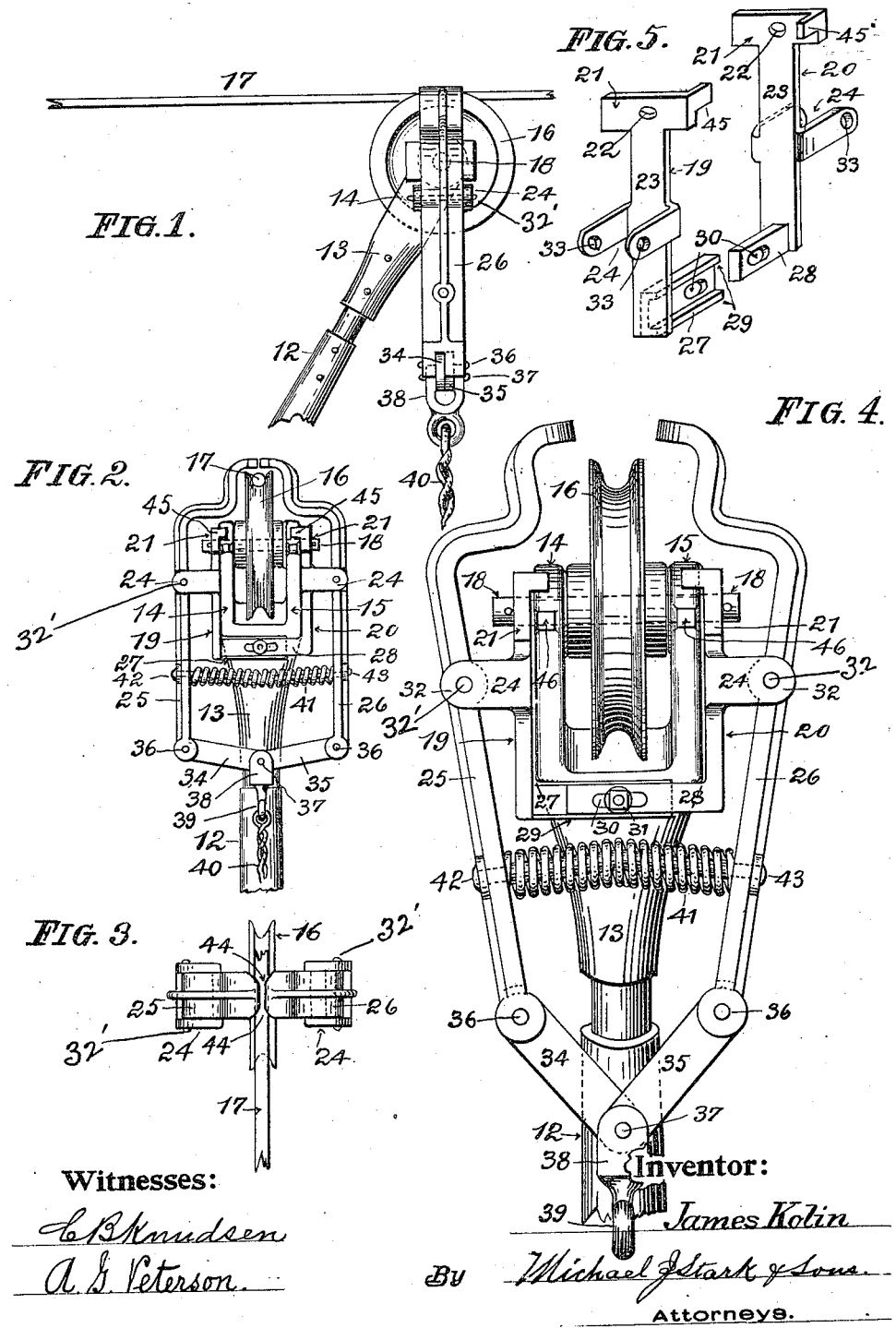

JAMES KOLIN, OF CHICAGO, ILLINOIS, ASSIGNOR OF ONE-HALF TO WILLIAM E. SMITH, OF CHICAGO, ILLINOIS.

TROLLEY FOR ELECTRICALLY-PROPELLED VEHICLES.

960,559.  Specification of Letters Patent.  Patented June 7, 1910.

Application filed May 24, 1909. Serial No. 497,903.

*To all whom it may concern:*

Be it known that I, JAMES KOLIN, a citizen of the United States, and resident of Chicago, in the county of Cook and State of Illinois, have invented certain new and useful Improvements in Trolleys for Electrically-Propelled Vehicles; and I do hereby declare that the following description of my said invention, taken in connection with the accompanying sheet of drawings, forms a full, clear, and exact specification, which will enable others skilled in the art to which it appertains to make and use the same.

This invention has general reference to improvements in trolleys for electrically propelled cars; and it consists, essentially, in the novel and peculiar combination of parts, and details of construction, as hereinafter first fully set forth and described, and then pointed out in the claims.

The object of this invention is the production of a trolley which, while preventing the running off the overhead conducting wire shall also function as an ice-scraper to dislodge ice from said overhead electroconductor. To attain this object, I construct the trolley as illustrated in the drawings already referred to, and in which—

Figure 1 is a side-elevation of a portion of a trolley-mast or pole and the trolley harp, fitted with my invention. Fig. 2 is a side-elevation of the same showing the device in running condition. Fig. 3 is a plan of the same. Fig. 4 is a side-elevation, on a larger scale, illustrating the device in a condition of release of the electroconductor. Fig. 5 is a perspective view of the cheeks or side-pieces detached.

12 in these drawings designates the trolley-pole of usual construction, which pole has on its upper end a harp 13 between the parallel members 14 and 15 of which there is journaled the trolley-wheel 16, engaging the overhead electroconductor 17. To the outer sides of the parallel members 14 and 15, and upon the pivot 18 upon which the trolley-wheel 16 is mounted, there are located two cheeks 19 and 20 respectively, shown in detail in Fig. 5, and comprising a T-shaped body having in its upper member 21 an aperture 22 for the passage of the pivot 18, and about midway of their vertical members 23, two outwardly projecting lugs constituting a double eye 24, wherein are pivoted two levers 25 and 26 respectively, to which reference will hereinafter be more fully had. At the lower end of the vertical portion of the cheeks 19 and 20 there are inwardly-projecting lugs 27 and 28, of which the lug 27 has projecting ledges 29 between which the lug 28 on the cheek 20 is adapted to slide, whereby the cheeks 19 and 20 are adapted to fit harps of varying widths, there being in the lugs 27 and 28 slotted apertures 30, through which a bolt 31 Fig. 4, is passed to securely hold the cheeks together. The levers 25 and 26 are bent in such manner that when they are in their normal position, as shown in Figs. 2 and 3, they meet a short distance above the trolley-wheel 16 and they then follow the outline of the latter and finally reach outwardly and do inwardly, there being bosses 32 on said levers, which are perforated to receive pivotal bolts or pins 32' which pass through said bosses and apertures 33, in the lugs of the double eyes 24.

The lower ends of the levers 25 and 26 are slotted to receive links 34, 35, said links being pivoted to the lower ends of the levers 25, 26, by pivotal bolts 36 with one end, their opposite ends being jointly connected by a pivotal bolt 37, upon which bolt there is also located a double-eye 38, having a ring 39, to which the rope 40, employed for handling the trolley, is attached.

Between the levers 25 and 26 there is located a spiral spring 41, placed upon studs 42 and 43 riveted or otherwise secured to the levers 25 and 26. These studs, when the parts of this device are in their normal position shown in Figs. 2 and 3, do not meet, their inner, opposing, ends being a predetermined distance apart, but when the rope 40 is pulled and the lower ends of said levers caused to approach each other by the links 34 and 35, these studs 42 and 43 will meet, thereby forming a stop to prevent further movement of said levers 25 and 26.

The upper, inner, ends of the levers 25 and 26 are outwardly curved, as shown at 44 in Fig. 3, the object of which will further on be fully disclosed.

The operation of this device is as follows: Assuming the parts to be in their normal position and the trolley off the overhead electroconductor; to cause the trolley to engage the overhead conductor, the rope 40 is pulled. This will cause the lower ends of the levers 25 and 26 to move toward, and the upper ends thereof to move away from, each other, (the spiral spring 41 being weaker than the spring or springs usually employed in trolley-bases to support the pole 12,) until the inner ends of the studs 42, 43, meet and prevent further movements of the levers 25, 26. By continuing pulling on the rope and manipulating the same in the usual manner, the trolley-wheel is connected with the overhead electroconductor, when the rope 40 is slackened, thereby causing the spiral spring 41 to push the lower ends of the levers 25, 26 apart and their upper ends to close over the electroconductor, thereby preventing the trolley from leaving the latter under all the various conditions of travel. When the trolley reaches an overhead crossing or switch the upper ends of the levers will be moved outwardly by said crossing to pass over the same, but they will immediately resume their normal position as soon as the trolley has passed such overhead crossing. And in order that the upper ends of the levers 25, 26 may be readily moved when reaching the crossing, they are outwardly curved or flared at 44 as described.

In order to prevent the levers 25, 26 from being rearwardly moved beyond a predetermined limit, when the trolley reaches a crossing, there are formed on the upper members 21 of the cheeks 19 and 20 inwardly projecting members 45, and on the parallel members 14 and 15 of the harp 13, there are formed outwardly projecting stubs 46, serving as stops to prevent further backward movement when the members 45 strike these stops 46.

The upper ends of the levers 25 and 26 form, as it were, jaws which partly surround the overhead electroconductor when the trolley is in engagement therewith. It, therefore, follows that in winter-time when ice and snow are apt to be formed or located, on said overhead electroconductor, these jaws will function as scrapers or breakers to dislodge the snow and ice from the electroconductor and thereby remove one of the most frequent annoyances and obstructions to the movement of electrically propelled cars during the winter season.

Having thus fully described this invention, I claim as new and desire to secure to me by Letters Patent of the United States—

1. In a trolley for electrically propelled vehicles, a pole; a harp at the upper end of said pole; a trolley-wheel pivoted in said harp; cheeks on the outer faces of said harp and pivoted to the pivot of said trolley-wheel, each of said cheeks having outwardly projecting lugs forming double-eyes, and inwardly projecting members, one of said members having ledges, and both members having slotted apertures, and a bolt, adapted to unite said members and levers pivoted to said outwardly-projecting lugs, as described.

2. In an electrically operated vehicle a trolley-pole; a harp at the upper end of said pole; a trolley-wheel pivoted in said harp; cheeks on the outer faces of said harp and pivoted thereto; levers pivoted to said cheeks, the upper ends of said levers being bent and reaching over said trolley-wheel; links at the lower ends of said levers, said links being pivoted to said levers with one end, and to each other with their other ends; inwardly projecting studs on said levers adapted to limit the inward movement of the lower ends of said levers, and a spiral spring upon said studs adapted to force the lower ends of said levers outwardly.

3. In an electrically operated vehicle a trolley-pole; a harp at the upper end of said pole; a trolley-wheel pivoted in said harp; cheeks on the outer faces of said harp and pivoted thereto; levers pivoted to said cheeks, the upper ends of said levers being bent and reaching over said trolley-wheel; links at the lower ends of said levers, said links being pivoted to said levers with one end and to each other with their other ends; inwardly projecting studs on said levers, and a spiral spring upon said studs, said studs being adapted to form stops to prevent the levers from approaching each other beyond a predetermined distance.

4. In a trolley for electrically operated vehicles, a pole; a harp on the upper end of said pole; a trolley-wheel pivoted in said harp, cheeks on the outer faces of said harp and pivoted thereto, said cheeks having inwardly-projecting members; stops on said harp; levers pivoted to said cheeks, the upper ends of said levers being inwardly bent to form jaws; links connecting the lower ends of said levers; means on said links for pivotally connecting one with the other; a spiral spring between the levers, studs upon which said spiral spring is mounted, said studs affording means for limiting the inward movement of said levers.

In testimony that I claim the foregoing as my invention, I have hereunto set my hand in the presence of two subscribing witnesses.

JAMES KOLIN.

Witnesses:
MICHAEL J. STARK,
A. G. PETERSON.